(12) United States Patent
Okada et al.

(10) Patent No.: US 7,452,448 B2
(45) Date of Patent: Nov. 18, 2008

(54) FAT PRODUCING METHOD

(75) Inventors: Tadayuki Okada, Izumisano (JP); Kotaro Yamaguchi, Tsukuba-gun (JP)

(73) Assignee: Fuji Oil Company, Limited, Osaka (JP)

( * ) Notice: Subject to any disclaimer, the term of this patent is extended or adjusted under 35 U.S.C. 154(b) by 609 days.

(21) Appl. No.: 10/509,394

(22) PCT Filed: Mar. 28, 2002

(86) PCT No.: PCT/JP02/03135

§ 371 (c)(1),
(2), (4) Date: Oct. 6, 2004

(87) PCT Pub. No.: WO03/083022

PCT Pub. Date: Oct. 9, 2003

(65) Prior Publication Data

US 2005/0145475 A1 Jul. 7, 2005

(51) Int. Cl.
*B01D 3/34* (2006.01)
*C11C 1/10* (2006.01)
*C11C 3/10* (2006.01)
*C12P 7/64* (2006.01)

(52) U.S. Cl. .................. 203/34; 426/601; 435/134; 554/169; 554/175

(58) Field of Classification Search .............. 203/34, 203/100; 426/601, 607, 611; 435/134; 554/169, 554/124, 142, 174, 175
See application file for complete search history.

(56) References Cited

U.S. PATENT DOCUMENTS

| | | | | | |
|---|---|---|---|---|---|
| 4,275,081 | A | * | 6/1981 | Coleman et al. | 426/33 |
| 5,225,049 | A | * | 7/1993 | Barmentlo et al. | 203/34 |
| 5,250,155 | A | * | 10/1993 | Zwanenburg et al. | 203/34 |
| 5,424,090 | A | * | 6/1995 | Okawauchi et al. | 426/607 |
| 5,512,691 | A | * | 4/1996 | Barnicki et al. | 203/28 |
| 6,524,527 | B2 | * | 2/2003 | Fimreite et al. | 426/648 |
| 6,969,771 | B2 | * | 11/2005 | Okada et al. | 554/169 |
| 2007/0191619 | A1 | * | 8/2007 | Rongione et al. | 554/126 |

FOREIGN PATENT DOCUMENTS

| | | |
|---|---|---|
| JP | 4-261497 | 9/1992 |
| JP | 2002-105484 | 4/2002 |
| JP | 2002-105484 | 10/2002 |

OTHER PUBLICATIONS

Law Kia Sang, "A review on the use of citric acid in the processing of oils and fats", Oleagineux, vol. 39, No. 2, pp. 89 to 98, 1984.

Н.М. ЛАВРИНОВИЧ, ДЕЗОДОРАЦИЯ ПИЩЕВОГО МАСЛА, Maslo-Zhir Prom-st, 1984, No. 10, p. 33.

* cited by examiner

*Primary Examiner*—Virginia Manoharan
(74) *Attorney, Agent, or Firm*—Wenderoth, Lind & Ponack, L.L.P.

(57) ABSTRACT

A method for producing a fat by distillation and purification while preventing isomerization. The distillation and purification is conducted under an acidic condition to prevent isomerization.

3 Claims, No Drawings

FAT PRODUCING METHOD

TECHNICAL FIELD

The present invention relates to a method for producing a fat.

BACKGROUND ART

Interesterification is one of effective means as a method for improving a fat. Conventionally, interesterification has been classified roughly into two methods, one is a chemical technique, that is,. a metal catalytic method, wherein random interesterification is performed by using a substance such as an alkali metal alcoholate, an alkali metal, an alkali metal hydroxide, etc. as a catalyst, and the other is an enzymatic interesterification method, wherein regiospecific or random interesterification is performed by using a lipase.

In the metal catalytic method and the enzymatic interesterification method, when the interesterification reaction is completed, an unreacted fatty acid ester remains, or diglycerides and monoglycerides or free fatty acids which are reaction by-products are produced. The presence of this fatty acid ester, diglycerides, monoglycerides and free fatty acids is known to have adverse effect on quality of an interesterified fat occasionally. For example, in a method for producing high value added symmetric triglycerides, a typical example thereof is cacao butter, obtained by enzymatic interesterification of triglycerides and a fatty acid ester using a lipase, and since the aforementioned unnecessary components significantly influence quality of high value added symmetric triglycerides, they should be removed as much as possible.

Usually, for producing 1,3-saturated-2-unsaturated triglycerides (hereinafter, sometimes, referred to as SUS), which are a major component of triglycerides, triglycerides (TG) and a fatty acid or its monohydric alcohol ester are subjected to an interesterification reaction with an enzyme. Since SUS triglycerides and fatty acids or their monohydric alcohol esters (FA) are produced, after the reaction, the fatty acids or their monohydric alcohol esters (FA) are distilled off by subjecting the reaction mixture to distillation-refining (purification). After distillation-refining, SUS triglycerides are concentrated by fractionation to increase a SUS component.

DISCLOSURE OF THE INVENTION

Then, under these circumstances, the present inventors aim at providing a method for suppressing isomerization as much as possible upon refining a fat by distillation.

The present inventors have studied intensively and, as the result, found that, upon distillation-refining of a reaction fat (reaction mixture) after completion of interesterification, when the reaction fat is refined by distillation under acidic conditions by addition of an organic acid, isomerization of a SUS component is suppressed. Thus, the present invention has been completed.

That is, the gist of the present invention is a method for producing a fat, which comprises removing a part or all of fatty acids or their monohydric alcohol esters (FA) from a mixture (MX) containing triglycerides (TG) and fatty acids or their monohydric alcohol esters (FA) by distillation-refining, wherein the removal is performed by adding an organic acid. The present invention includes the following features:

(1) The aforementioned method, wherein the mixture (MX) is a selective interesterification reaction product;

(2) The aforementioned method, wherein a total of triglycerides (TG) and fatty acids or their monohydric alcohol esters (FA) in the mixture (MX) is 95% or larger;

(3) The aforementioned method, wherein the organic acid is added by allowing contact of an aqueous organic acid solution with the mixture (MX);

(4) The aforementioned method, wherein after removal of only a part of fatty acids or their monohydric alcohol esters (FA) from the mixture (MX), a fresh fatty acid or its monohydric alcohol ester (FA) is added, followed by subjecting the resulting mixture again to the selective interesterification reaction;

(5) The aforementioned method, wherein the removal of only a part of fatty acids or their monohydric alcohol esters (FA) from the mixture (MX) is performed at a temperature of at least 15° C. lower than that at which the removal of all of fatty acids or their monohydric alcohol esters (FA) from the mixture (MX) is performed; and (6) The aforementioned method, wherein the fresh fatty acid or its monohydric alcohol ester (FA) is a hydrogenated product of fatty acids or their monohydric alcohol esters (FA) separated from the mixture (MX).

BEST MODE FOR PERFORMING THE INVENTION

Examples of the aforementioned organic acid include citric acid ascorbic acid, succinic acid, maleic acid, and oxalic acid. As a method for adding an organic acid to the mixture (MX), an organic acid can be added in the state that the organic acid is dissolved or dispersed in water or an aqueous solution containing a lower alcohol, or in the state of a powder. Preferably, the organic acid is added and dissolved in a reaction fat with mixing.

However, since solubility of an organic acid in the mixture (MX) is low and it is hardly soluble therein, sometimes, the organic acid in a crystal state remains in the mixture (MX) and, when the mixture is subjected to distillation-refining as such, the organic acid is distilled off together with the fatty acids or their monohydric alcohol esters. Since such an organic acid thus distilled off tends to clog a piping of a distillation apparatus, preferably, an organic acid remaining in a crystal state in the reaction fat is removed by filtering or the like.

An amount of an organic acid to be added is not specifically limited, but an appropriate amount of an organic acid to be added is preferably 0.1 to 2% by weight relative to the mixture (MX). When the amount to be added is too small, isomerization suppressing effect is hardly obtainable. On the other hand, when an organic acid is excessively added, since the amount of an organic acid to be dissolved in the mixture (MX) is unchanged, isomerization suppressing effect is not increased. On the contrary, the aforementioned removal of an organic acid remaining in a crystal state without being dissolved in the mixture (MX) is troublesome. Therefore, preferably, the aforementioned range of an organic acid is added.

In the present invention, a typical example of the mixture (MX) is an interesterification reaction fat of triglycerides (TG) and fatty acids or their alcohol esters (FA). This interesterification reaction is performed preferably in the presence of an enzyme having ester activity such as a lipase, more preferably in the presence of an immobilized or intracellular 1,3-regioselective lipase. Examples of the 1,3-regioselective lipase to be used for immobilization include lipases derived from microorganisms such as genus *Rhizopus*, genus *Aspergillus*, and genus *Mucor*, a pancreatic lipase, and the like.

While the mixture (MX) is not limited to a selective interesterification reaction fat, and the present invention is generally applicable to various fats and oils which are subjected to distillation-refining, the method of suppressing isomerization of the present invention greatly manifests isomerization suppressing effect on an interesterification reaction fat containing a SUS component, which can be used as a raw material fat of hard butter,as a main triglyceride component.

In case of an interesterification reaction fat containing a SUS component, which can be used as a raw material fat of hard butter, as a main triglyceride component, when an amount of unnecessary components (monoglycerides, diglycerides, etc.) is increased, functions as hard buffer is reduced. Therefore, in the present invention, it is desirable that a total of triglycerides (TG) and fatty acids or their monohydric alcohol esters (FA) in the mixture (MX) is 95% or larger, preferably 98% or larger.

In the present invention, when a fat having a high SUS component content is produced by interesterification of, in particular, ethyl stearate and a fat rich in oleic acid, it is advantageous to adopt a method comprising steps of: as a fist step, subjecting ethyl stearate and a fat rich in oleic acid to interesterification, and distilling off a monohydric alcohol ester which binds to reacted oleic acid at the completion stage of the reaction; and then, as a second step, again subjecting a fresh ethyl stearate and the aforementioned interesterification reaction fat to interesterification to obtain an interesterification reaction fat having a SUS component content higher than that of the reaction fat of the first step, and distilling off a monohydric alcohol ester which binds to reacted oleic acid and monoglycerides or free fatty acids from such a reaction fat, to obtain an interesterification reaction fat having a high SUS component content. In the aforementioned method, a hydrogenated product of the monohydric alcohol ester which binds to reacted oleic acid and is distilled off at the first step distillation can be advantageously utilized in place of the fresh ethyl stearate to be used in the second step.

In the aforementioned method, the monohydric alcohol ester which binds to reacted oleic acid to be distilled off at the first step distillation-refining can be distillated at a lower distillation temperature by distilling off only a part thereof. Then, heat history is small and an isomerization reaction can be relieved. In this case, preferably, the first step distillation is performed at a distillation temperature of at least 15° C. lower than. that at which the second step is performed.

When such a method is adopted, the first step distillation temperature for distilling off a monohydric alcohol ester which binds to reacted oleic acid after completion of the first step reaction is about 160° C. to 200° C. under reduced pressure (normally 5 torr or lower), and the second step distillation temperature for distilling off a monohydric alcohol ester which bind to reacted oleic acid and monoglycerides or free fatty acids after completion of the second step reaction is about 215 to 240° C. under reduced pressure (normally 5 torr or lower). In the present invention, an organic acid is added and dissolved in reaction fats in both first step and second step distillation-refining. In this case, preferably, an insoluble acid is removed by filtering before distillation-refining. That is, when an organic acid remains, sometimes, a piping is clogged to cause troubles during distillation-refining. Therefore, preferably, such an organic acid should be removed.

EXAMPLES

The following Examples illustrate embodiments of the present invention, but are merely illustration, and the spirit of the present invention is not restricted by them. In Examples, both parts and percents are by weight.

Example 1

A mixture of 80 parts of commercially available ethyl stearate (C18 purity: 97.8%) and 20 parts of a high oleic sunflower oil was subjected to an interesterification reaction in a column packed with diatomaceous earth carrying a lipase having 1,3-specificity. After the reaction, an aqueous citric acid solution, in which citric acid had been dissolved in ion-exchanged water so that the final concentration became 0.2%, was added to the resulting reaction mixture, and the mixture was stirred at 80° C. for 30 minutes. Then, the mixture was dehydrated at 110° C. for 30 minutes, and precipitated citric acid was removed by filtration. The resulting mixture was subjected to distillation-refining (2 torr, 180° C., 60 minutes) to remove a part of fatty acids or their monohydric alcohol esters, and fat glycerides were concentrated. To the concentrated fat glycerides was added a mixture of the fatty acids or their monohydric alcohol esters distilled off the above distillation-refining, which had been extremely hydrogenated until unsaturated fatty acid esters and unsaturated fatty acids became saturated fatty acid esters and saturated fatty acids, in such an amount that the triglyceride/ether ratio became 20/80. Then, a moisture content was adjusted to 70ppm, and the enzymatic interesterification reaction was performed again in a column. An aqueous citric acid solution was added again to the resulting reaction mixture of the latter interesterification, and the resulting mixture was subjected to distillation-refining (2 torr, 230° C., 90 minutes) to remove all of fatty acid esters and fatty acids, to obtain interesterified fat glycerides. The composition of the fat glycerides was analyzed by HPLC and TLC. In addition, 47 parts of the interesterified fat and 53 parts of a POP part fat ("Unilate P-110N" manufactured by Fuji Oil Co., Ltd.) were mixed and melted, and a cooling curve was measured based on a Jensen C.C. method (BS684: Section 1.13 Determination of cooling curve). The results of the analysis are shown in Table 1.

Example 2

According to the same manner as that described in Example 1, interesterified fat glycerides were obtained except that an aqueous ascorbic acid solution, in which ascorbic acid had been dissolved in ion-exchanged water so that the final concentration became 0.2%, was added to the reaction mixture, the mixture was stirred at 80° C. for 30 minutes and then dehydrated at 110° C. for 30 minutes, precipitated ascorbic acid was removed by filtration, and then the resulting mixture was subjected to distillation-refining. The results are shown in Table 1.

Comparative Example 1

According to the same manner as that described in Example 1, interesterified fat glycerides were obtained except that distillation-refining was performed without treatment with citric acid. The results together with those of Examples 1 and 2 are shown in Table 1.

TABLE 1

|  | SOS | SSO | SSS | Jensen CC | |
|---|---|---|---|---|---|
|  |  |  |  | T max | T min |
| Example 1 | 66.3 | 0.55 | 1.5 | 29.6 | 25.2 |
| Example 2 | 66.1 | 0.58 | 1.6 | 29.6 | 25.1 |
| Comparative Example 1 | 65.4 | 0.86 | 2.0 | 29.1 | 24.6 |

Further, chocolate was produced by using 12 parts of the mixed fat (45 parts of the interesterified fat and 55 parts of POP part fat ("Unilate P-110N" manufactured by Fuji Oil Co., Ltd.)) obtained in each of Examples 1 and 2, and Comparative Example 1, 40 parts of cacao mass, 48 parts of powder sugar and 0.5 part of lecithin, and tempering properties (peelability, broom resistance) were confirmed. As a result, although quality of Comparative Example 1 was good, quality of Examples 1 and 2 was extremely better as compared with Comparative Example 1.

As a result of the foregoing, when an organic acid is added to a reaction fat upon distillation-refining after completion of interesterification, a SUS component is hardly isomerized, and an interesterified fat having better quality can be obtained.

INDUSTRIAL APPLICABILITY

According to the present invention, there can be provided a method which can suppress isomerization of a SUS component which usually tends to occur during refining of a fat by distillation.

The invention claimed is:

1. A method for producing a fat, which comprises adding an organic acid selected from the group consisting of citric acid, ascorbic acid, succinic acid, maleic acid and oxalic acid to a mixture (MX) which is a selective interesterification reaction product and whose total content of triglycerides (TG) and fatty acids or their monohydric alcohol esters (FA) is 95% or larger to form a second mixture, and distillation-refining the second mixture to remove a part or all of fatty acids or their monohydric alcohol esters (FA) from the second mixture, suppressing isomerization of desired 1,3-saturated-2-unsaturated triglycerides (SUS), wherein after removal of only a part of fatty acids or their monohydric alcohol esters (FA) from the second mixture, a fresh fatty acid or its monohydric alcohol ester (FA) is added to the second mixture to form a third mixture, followed by subjecting the third mixture to the selective interesterification reaction, wherein the removal of only a part of fatty acids or their monohydric alcohol esters (FA) from the second mixture is performed at a temperature of at least 15°C. lower than that at which the removal of all of fatty acids or their monohydric alcohol esters (FA) from the second mixture is performed.

2. The method according to claim 1, wherein the organic acid is added by allowing to contact an aqueous organic acid solution with the mixture (MX).

3. The method according to claim 1 wherein the fresh fatty acid or its monohydric alcohol ester (FA) is a hydrogenated product of fatty acids or their monohydric alcohol esters (FA) separated from the second mixture.

* * * * *